(12) United States Patent  
Senatori

(10) Patent No.: US 8,619,172 B2  
(45) Date of Patent: Dec. 31, 2013

(54) ROTATABLE CAMERA ASSEMBLY

(75) Inventor: Mark Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 12/750,979

(22) Filed: Mar. 31, 2010

(65) Prior Publication Data

US 2011/0242391 A1 Oct. 6, 2011

(51) Int. Cl.
*H04N 5/222* (2006.01)
*H04N 5/225* (2006.01)
*H04M 1/00* (2006.01)

(52) U.S. Cl.
USPC .... 348/333.01; 348/375; 348/376; 455/556.1

(58) Field of Classification Search
USPC ............ 361/679.01–679.29; 348/333.01, 348/373–376
See application file for complete search history.

(56) References Cited

U.S. PATENT DOCUMENTS

| | | | |
|---|---|---|---|
| 6,587,151 B1 | 7/2003 | Cipolla et al. | |
| 6,812,958 B1 * | 11/2004 | Silvester | 348/207.1 |
| 6,933,981 B1 * | 8/2005 | Kishida et al. | 348/375 |
| 6,980,425 B2 | 12/2005 | Chuang et al. | |
| 6,985,356 B2 * | 1/2006 | Wang | 361/679.06 |
| 7,061,536 B2 * | 6/2006 | Cha | 348/376 |
| 7,151,911 B2 * | 12/2006 | Matsumoto | 455/90.2 |
| 7,156,351 B2 * | 1/2007 | Wang et al. | 248/121 |
| 7,245,482 B2 * | 7/2007 | Kim | 361/679.27 |
| 7,269,442 B2 * | 9/2007 | Sato et al. | 455/556.1 |
| 7,821,783 B2 * | 10/2010 | Wang et al. | 361/679.27 |
| 7,903,400 B1 * | 3/2011 | Chen et al. | 361/679.27 |
| 7,936,559 B2 * | 5/2011 | Chen | 361/679.27 |
| 2003/0228847 A1 * | 12/2003 | Matsumoto | 455/90.3 |
| 2005/0099765 A1 * | 5/2005 | Wang | 361/681 |
| 2006/0128429 A1 * | 6/2006 | Cha | 455/556.1 |
| 2007/0281749 A1 * | 12/2007 | Suga | 455/566 |
| 2011/0099756 A1 * | 5/2011 | Chen | 16/297 |

FOREIGN PATENT DOCUMENTS

WO WO/00/70551 11/2000

* cited by examiner

*Primary Examiner* — Timothy J Henn
*Assistant Examiner* — Pritham Prabhakher
(74) *Attorney, Agent, or Firm* — Romiwa C. Akpala

(57) ABSTRACT

Embodiments of the present invention disclose a rotatable camera assembly and display panel. According to one embodiment, a panel housing is formed around the perimeter of the display panel having a horizontal axis of rotation. The panel housing includes vertically-arranged side portions that are adjacent to side portions of the display panel. The rotatable camera assembly includes a digital camera and is formed integral with at least one side portion of the panel housing. Furthermore, the axis of rotation of the camera assembly is coaxial with the axis of rotation of the display panel.

13 Claims, 4 Drawing Sheets

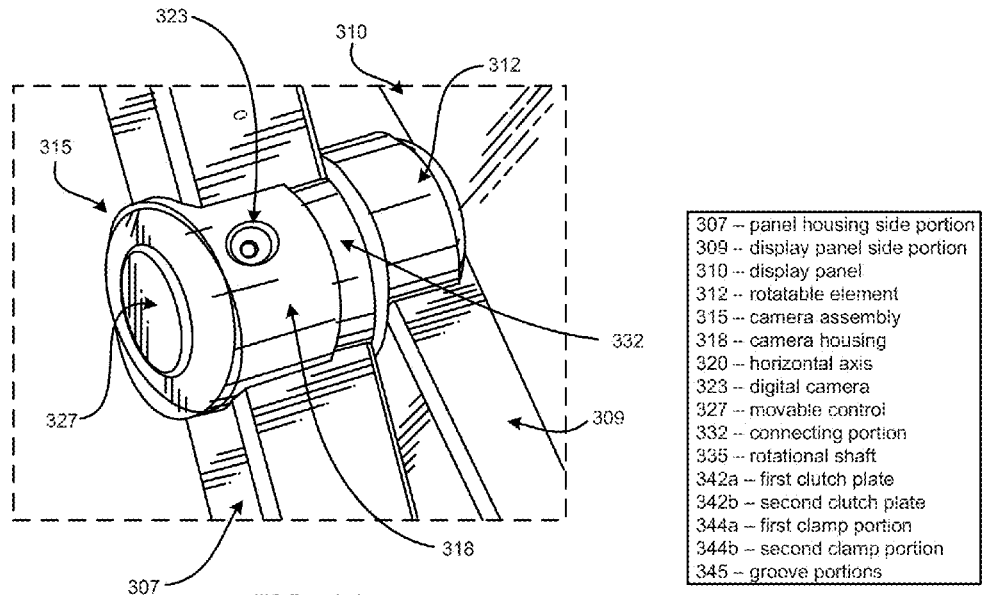
FIG. 3A
307 – panel housing side portion
309 – display panel side portion
310 – display panel
312 – rotatable element
315 – camera assembly
318 – camera housing
320 – horizontal axis
323 – digital camera
327 – movable control
332 – connecting portion
335 – rotational shaft
342a – first clutch plate
342b – second clutch plate
344a – first clamp portion
344b – second clamp portion
345 – groove portions
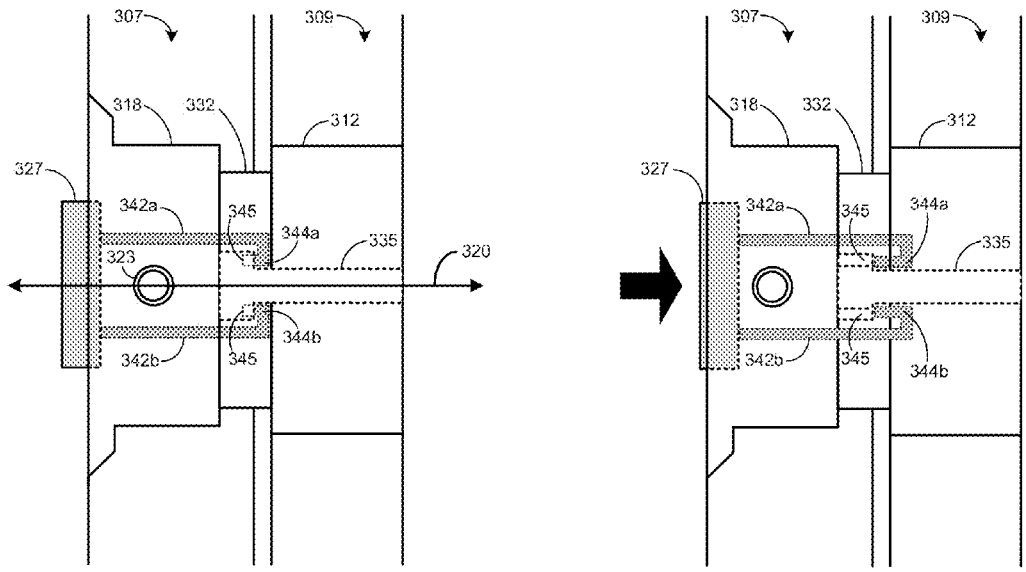
FIG. 3B
FIG. 3C

ROTATABLE CAMERA ASSEMBLY

BACKGROUND

Modern portable computers are equipped with a plethora of features and components that have enabled these mobile devices to become popular and useful everyday computing tools. Such standard features and components include wireless network connectivity, bluetooth synchronization, digital video disc drives, and front-mounted digital video cameras. In particular, digital video cameras are typically utilized for taking snap shots of a user or for video conferencing with other users from around the world.

When implemented in portable computers, a digital video camera is generally positioned around a top area of the display panel of the portable computer. Since most portable computers include pivotable display panels that may be positioned at various angles with respect to the base housing of the portable computer, the viewing angle and the field of view of the front-mounted digital camera is also affected. As a result, the user will sometimes need to adjust his relative sitting position to effectively view the image on the display, possibly leaving the digital camera's field of view. By the same measure, the user will sometimes need to adjust his sitting position to rest within the field of view of the digital camera, only to have an undesirable viewing angle of the display. Accordingly, it is often difficult to place both the display panel and front-mounted digital camera at optimum positions or viewing angles for the operating user.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a three-dimensional perspective view of a portable computer and a display panel in a non-tilted and aligned position, while

FIGS. 3A-3C are enlarged perspective views of a camera assembly according to an embodiment of the present invention.

NOTATION AND NOMENCLATURE

Figure 1:
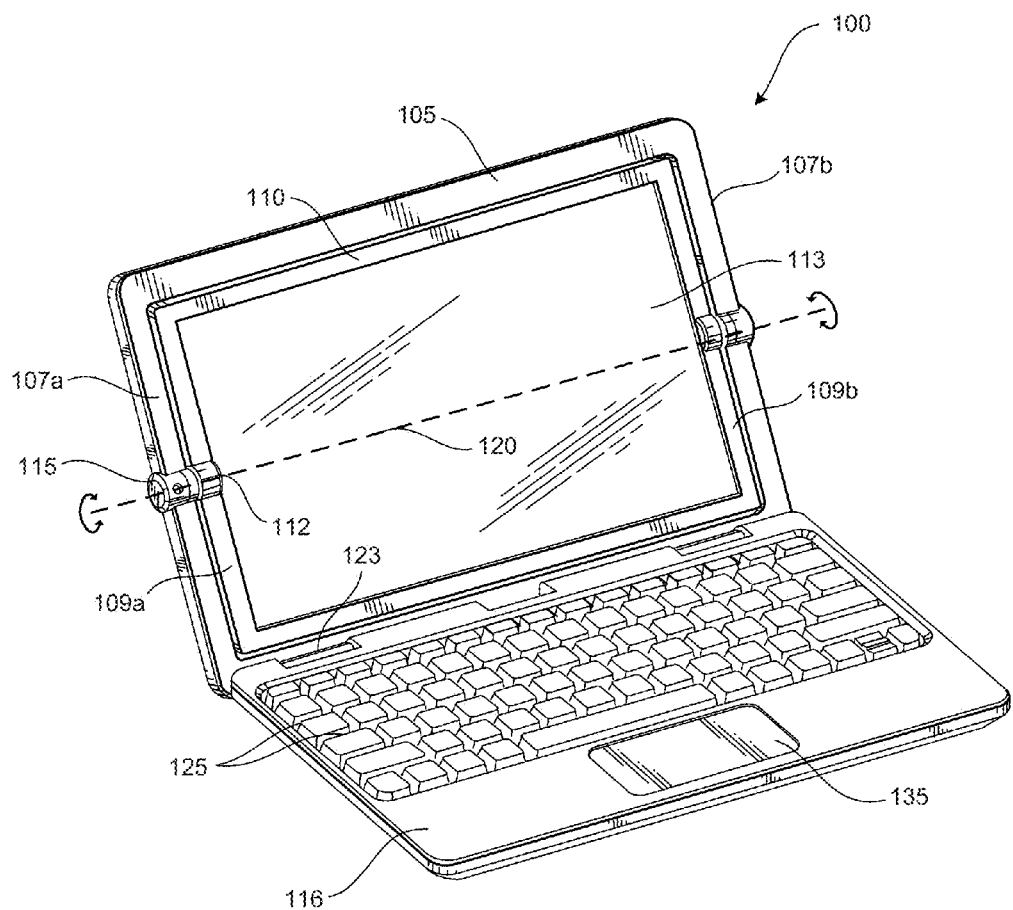
FIG. 1 is a three-dimensional perspective view of a portable computer according to an embodiment of the present invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

One solution to the aforementioned problem is to use a separate camera fixed within the frame structure of the display panel. However, such a solution does not allow display panel to rotate freely within a separate housing and does not allow for manual adjustment of the viewing angle of the digital camera assembly. Another solution involves the inclusion of two separate cameras facing in different directions so as to capture and utilize the field of view of each camera. However, extensive wiring and additional hardware makes mass implementation of this solution extremely costly and complicated.

Embodiments of the present invention provide a rotatable camera assembly having a camera orientation that is mechanically tied to rotational position of the display panel of a portable computer. According to one embodiment, the camera assembly is formed integral with the panel housing of the display and has an axis of rotation that is coaxial with the axis of rotation of the display panel. Furthermore, the camera assembly is mechanically coupled to the display panel such that both the camera assembly and display plane rotate about the same horizontal axis. As such, one embodiment allows the viewing angle of the camera to follow the front surface or visible region of display penal regardless of its orientation. As such, the digital camera can operate and maintain consistent functionality when the portable computer is in a conventional clamshell mode or in a reversed tablet operating mode.

Referring now in more detail to the drawings in which like numerals identify corresponding parts throughout the views, FIG. 1 is a three-dimensional perspective view of a portable computer according to an embodiment of the present invention. As shown here, the portable computer system 100 includes a display panel 110, panel housing 105, and a base housing 116. The display panel 110 includes a viewable display area 113 for presenting images and video to the user and may be a liquid crystal display, light emitting diode display, organic light-emitting diode display, or the like. Furthermore, the display panel 110 is configured to tilt and rotate about a horizontal axis 120, which is substantially centered with respect to the display panel 113.

According to one embodiment, the panel housing 105 is pivotably connected to base housing 116 via a hinge 123 for example. Base housing 116 includes devices and controls such as a keyboard 125 and a mouse 135 configured for manual input and operation of the portable computer system 100 by a user. Furthermore, panel housing 105 is formed around the perimeter of the display panel 110 and includes vertically-arranged side portions 107a and 107b that are adjacent to vertically-arranged side portions 109a and 109b of the display panel 110. In accordance with an embodiment of the present invention, a digital camera assembly 115 is mounted on a side portion 107a of the panel housing 105 and represents a mechanical tilting construction including a digital camera and lens, which are configured to digitally record images via an electronic sensor and reproduce the images on the viewable display area 113. Furthermore, the camera assembly 115 is mechanically coupled to a rotatable element 112 positioned on a side portion 109a of the display panel 110. A more detailed description of the digital camera assembly 115 will be in described in further detail below.

Figure 2A:
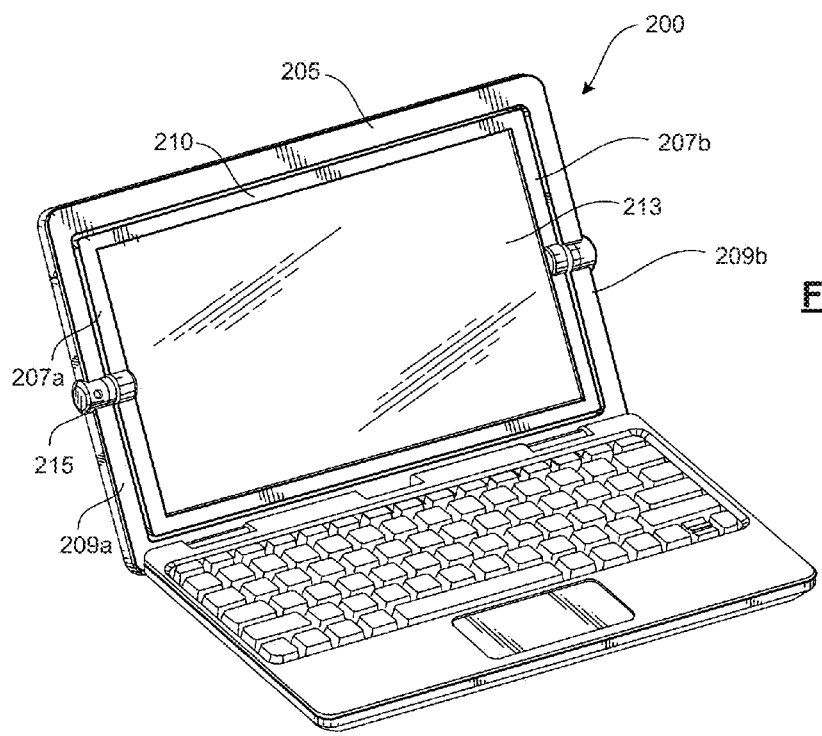
Figure 2B:
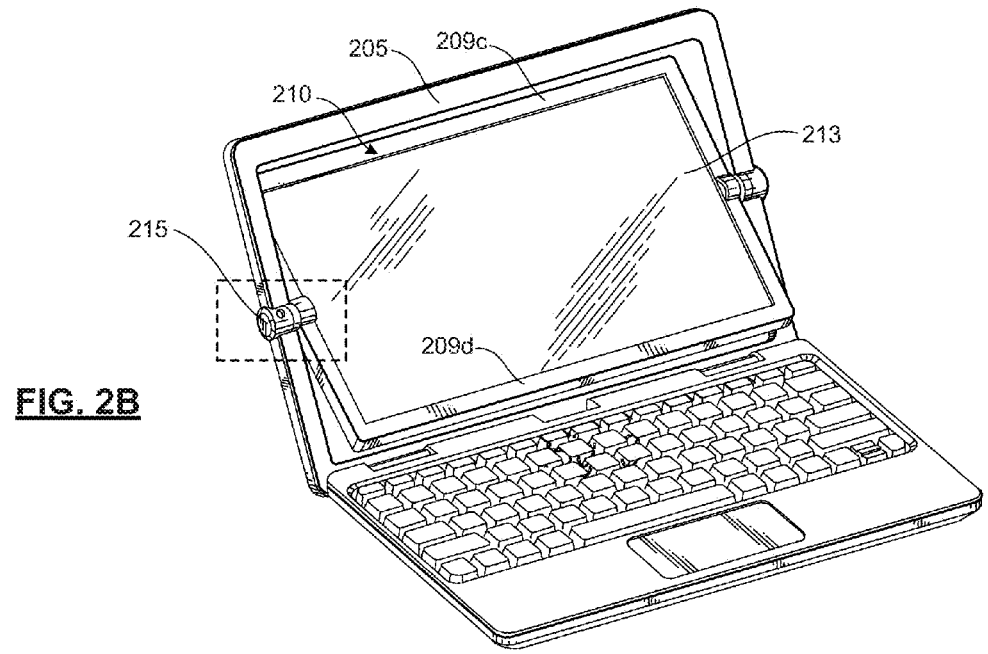
FIG. 2B is a three-dimensional perspective view of the portable computer and display panel in a tilted and unaligned position according to an embodiment of the present invention.

FIG. 2A is a three-dimensional perspective view of a portable computer in a non-tilted or aligned position, while FIG. 2B is a three-dimensional perspective view of the portable computer in a tilted position according to an embodiment of the present invention. As shown in the embodiment of FIG. 2A, the portable computer system 200 includes a display panel 210 and viewable area 213, a panel housing 205, and a digital camera assembly 215. Here, the display panel 210 is in an aligned position with respect to the panel housing 205. More particularly, when in the aligned position, the display panel 210 is coplanar with the panel housing 205 such that the side portions 207a and 207b of the panel housing 205 are substantially congruent with the side portions 209a and 209b of the display panel 210.

Turning now to FIG. 2B, this illustration depicts the display panel 213 of the portable computer 200 in a tilted and unaligned position with respect to the panel housing 205. As shown here, the display panel 213 is tilted or rotated backward along horizontal axis 220 such that a top portion 209c of the display panel is positioned behind and away from the panel housing 205, while a bottom portion 209d of the display housing 213 is positioned in front of the panel housing 205 towards the keyboard area. Moreover, side portions 207a and 207b of the display panel 213 are no longer congruent with the side portions 209a and 209b of the panel housing 205. According to one embodiment and as shown in FIG. 2B, the camera assembly 215 and digital camera 223 are coaxial, or share the same horizontal axis 220 with the display panel 210, and are configured to automatically rotate along horizontal axis 220 in the same manner as the tilt and rotation of the display panel 210 along horizontal axis 220. As such, the viewable area 213 of the display panel 210 will effectively correspond with the field of view of the digital camera 223 of camera assembly 215 as will be explained in more detail with reference to FIGS. 4A-4C.

FIG. 3A is an enlarged view of a camera assembly as indicated by the dotted box shown in FIG. 2B. According to one embodiment of the present invention, the camera assembly 315 includes a digital camera 323, camera housing 318, a connecting portion 332, and a movable control 327 mounted on a side portion 307 of the panel housing. The camera assembly 315 is mechanically coupled to the rotatable element 312 of the display panel 310 via the connecting portion 332. Accordingly, the camera assembly 315 is configured to automatically rotate upon rotation of the rotatable element 312 and display panel 310. Movable control 327 may represent a button, lever, or other mechanical means configured to disengage the camera assembly 315 from the connecting portion 332 so that the camera housing 318 can be manually rotated by the user without causing simultaneous rotation and tilting of the rotatable element 312 or display panel 310.

FIGS. 3B and 3C depict enlarged front views of the camera assembly according to an embodiment of the present invention. As shown in FIG. 3B, two clutch plates 342a and 342b are attached to the movable control 327. A rotatable shaft 335 includes groove portions 345 and extends perpendicularly from the rotatable element 312 of the display panel 310 into the connecting portion 332. Still further, clamp portions 344a and 344b of clutch plates 342a and 342b respectively, are configured to engage and lodge within groove 345 of the rotatable shaft 335. As such, movement of the rotatable shaft 335 causes the movable control 327, the camera housing 318, and digital camera 323 to rotate accordingly. However, and as shown in FIG. 3C, the movable control 327 may be depressed by the user so as to cause the clamp portions of 344a and 344b of clutch plates 342a and 342 to disengage and dislodge from the groove portions 345 of the rotational shaft 335. When disengaged, the camera assembly may freely rotate about the horizontal axis 320 while the rotatable element 312 of the display panel 310 remains stationary. In one embodiment, when the camera assembly 315 has articulated one full cycle or 360 degrees, the clamp portions 344a and 344b of clutch plates 342a and 342b may automatically reengage with the grooves 345 of the rotational shaft 335 at the original disengagement or alignment position. Alternatively, the clap portions 344a and 344b may engage the rotational shaft 335 via an adhesive, magnet, or other fixing mechanism.

Figure 4A:
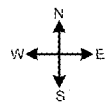
FIGS. 4A-4C are illustrations of various field of views of a camera assembly mounted on a portable computer according to one embodiment of the present invention.
Figure 4A:
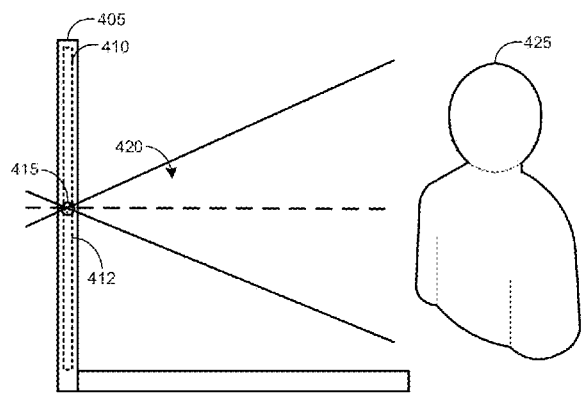
Figure 4B:
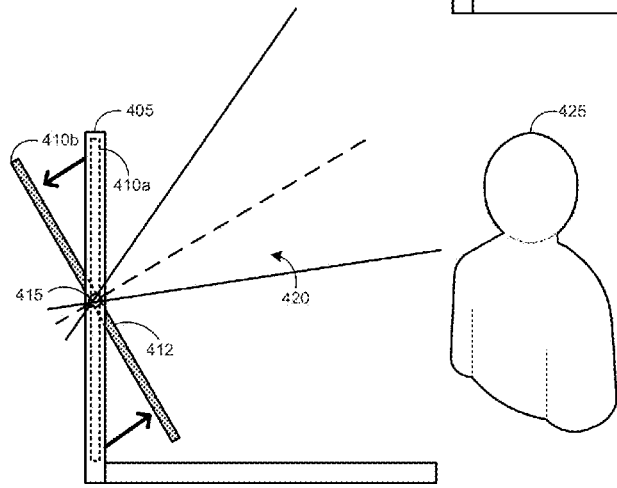
Figure 4C:
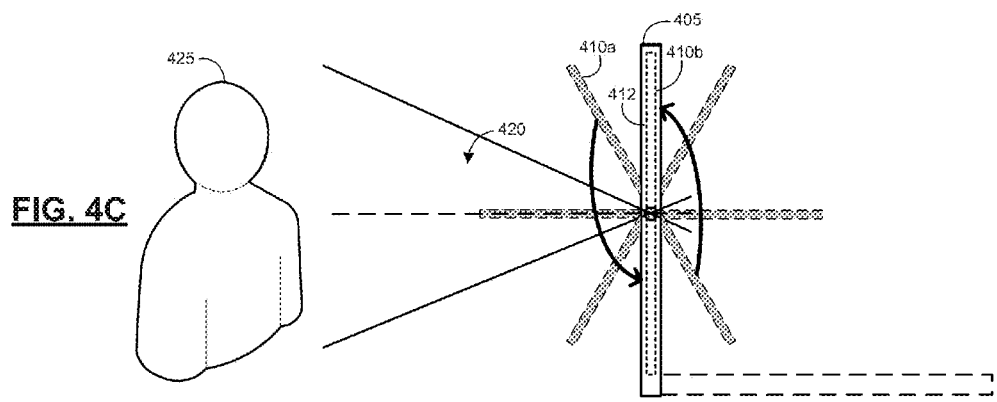

FIGS. 4A-4C are illustrations of various field of views of a camera assembly mounted on a portable computer according to one embodiment of the present invention. According to the present embodiments, the digital camera of the camera assembly 415 includes a field of view or vision 420, which represents the angular extent of the world that is visible by the digital camera at a particular position and orientation in space. FIG. 4A is an exemplary illustration of the field of view 420 of the digital camera when the display panel 410 is in an aligned position with the panel housing 405. As shown in this embodiment, the field of view 420 of the digital camera faces in the same direction (i.e. eastward) as the front surface or viewable area 412 of the display panel 410.

FIG. 4B is an exemplary illustration of the field of view 420 of the digital camera and camera assembly 415 when the display panel is rotated from an aligned position 410a to a tilted position 410b. As shown here and explained above, the camera assembly 415 automatically rotates upon rotation of the display panel 410 so as to alter the field of view 420 of the digital camera. In the example of FIG. 4B, the display panel 410 is tilted about 30° with respect to the panel housing 405 such that the viewable area 412 of the display panel 410 still faces in the same direction as the angled (e.g. about 30° to the normal plane) field of view of the camera assembly 415. As such, the user 425 is able to reorient the viewable area and angle of the display panel 425 without having to also manually adjust the orientation of the camera assembly 415.

FIG. 4C is an exemplary illustration of the field of view 420 of the digital camera and camera assembly 415 when the display panel is rotated from the tilted position 410a to a tablet or reverse position 410b, and more specifically, 180° from the aligned position shown in FIG. 4A. As shown in FIG. 4A, the field of view 420 of the digital camera and camera assembly 415 reverses and faces westward accordingly so as to correspond to the facing direction (i.e. direction perpendicular to the front surface of the display panel) of the visible area 412 of the display panel 410. This particular orientation is useful when the user 425 is operating the portable computer in a tablet mode (e.g. touchscreen input without use of a keyboard or mouse of the base housing 416) as opposed to the conventional clam-shell operating environment. Moreover, in the illustrative examples of FIGS. 4B and 4C, the panel housing 405 remains stationary while the display panel 410 freely rotates therein.

Embodiments of the present invention provide a rotatable camera assembly and digital camera that is mechanically coupled to the rotation of the display panel within a panel housing of a portable computer. More specifically, the camera assembly of the present embodiments is mounted on a side portion of the panel housing and includes as an axis of rotation that is coaxial with the axis of rotation of the display panel. As such, camera field of view follows the front surface or visible region of display penal regardless of the orientation of the digital camera.

Many advantages are afforded by the camera assembly module according to embodiments of the present invention. For example, such a configuration allows the digital camera to automatically and consistently face in the same direction and orientation as the viewable display, while simultaneously enabling the user the flexibility of changing the camera position and orientation manually. As such, the digital camera can operate and maintain reliable functionality when the portable computer is in a conventional clamshell operating mode or in a reversed tablet-style operating mode.

Furthermore, while the invention has been described with respect to exemplary embodiments, one skilled in the art will recognize that numerous modifications are possible. For example, although exemplary embodiments depict a convertible tablet computer as the portable computer, the invention is not limited thereto. For example, the portable computer may be a netbook, an electronic reading device or e-reader, a cell phone, or any other electronic device capable of having a rotatable display panel. Furthermore, the axis of rotation of the display panel and camera assembly may be a direction other than horizontal. For example, the display panel and camera assembly may rotate about a diagonal or vertical axis of rotation.

In the foregoing description, numerous details are set forth to provide an understanding of the present invention. However, it will be understood by those skilled in the art that the present invention may be practiced without these details. Thus, although the invention has been described with respect to exemplary embodiments, it will be appreciated that the invention is intended to cover all modifications and equivalents within the scope of the following claims.

What is claimed is:

1. A system comprising:
a base housing;
a display panel having a horizontal axis of rotation;
a panel housing coupled via a hinge to the base housing and formed around a perimeter of the display panel, wherein the panel housing includes vertically-arranged side portions adjacent to side portions of the display panel; and
a rotatable camera assembly including a digital camera formed integral and continuously with at least one of the vertically-arranged side portions of the panel housing,
wherein an axis of rotation of the camera assembly is coaxial and shares the same axis of rotation of the display panel such that rotation of the display panel within the panel housing causes corresponding rotation of the camera assembly;
wherein the display panel is configured to pivot within and separately from the panel housing about the horizontal axis of rotation.

2. The system of claim 1, wherein the horizontal axis of rotation of the display panel is substantially centered with respect to the display panel.

3. The system of claim 1, wherein the camera assembly includes a movable control for manually adjusting the viewing angle of the camera by a user.

4. The system of claim 3, wherein the rotation of the camera assembly automatically tracks and follows the rotation of the display panel such that a viewable area of the display panel always faces in the same direction as the field of view of the digital camera.

5. The system of claim 3, wherein the movable control of the camera assembly is coupled to a plurality of clutch plates configured to engage and disengage from a rotatable shaft mounted in the display panel.

6. The system of claim 1, wherein the camera assembly and the display panel are configured to tilt and rotate at least 180 degrees with respect to the panel housing.

7. A portable computer comprising:
a display panel having a horizontal axis of rotation and side portions;
a base unit pivotably coupled to a panel housing, wherein the panel housing is formed around the perimeter of the display panel and includes vertically-arranged side portions adjacent to side portions of the display panel; and
a camera assembly including a digital camera and formed integral and continuously with at least one of said vertically-arranged side portions of the panel housing,
wherein an axis of rotation of the camera assembly is coaxial and shares the same axis of rotation of the display panel such that rotation of the display panel within the panel housing causes corresponding rotation of the camera assembly, and
wherein the display panel is configured to pivot within and separately from the panel housing about the horizontal axis of rotation.

8. The portable computer of claim 7, wherein the horizontal axis of rotation of the display panel is substantially centered with respect to the display panel.

9. The portable computer of claim 7, wherein rotation of the camera assembly automatically tracks and follows the rotation of the display panel such that a viewable area of the display panel always faces the same direction as the field of view of the digital camera of the camera assembly.

10. The portable computer of claim 7, wherein the camera assembly includes a movable control for manually adjusting the viewing angle of the camera by a user.

11. The portable computer of claim 10, wherein the movable control of the camera assembly is coupled to a plurality of clutch plates configured to engage and disengage from a rotatable shaft mounted in the display panel.

12. The portable computer of claim 7, wherein the camera assembly and the display panel are configured to rotate at least 180 degrees.

13. The portable computer of claim 12, wherein the portable computer operates in a tablet mode when the display panel is rotated 180 degrees.

* * * * *